(No Model.)

H. S. PECK.
ROPE CLAMP.

No. 436,315. Patented Sept. 9, 1890.

WITNESSES
S. D. Dobbins.
Chas. G. N. Breviller.

INVENTOR
Henry S. Peck
by Hallock & Hallock
attys

UNITED STATES PATENT OFFICE.

HENRY S. PECK, OF NORTH EAST, PENNSYLVANIA, ASSIGNOR TO ROBERT J. MOORHEAD, OF SAME PLACE.

ROPE-CLAMP.

SPECIFICATION forming part of Letters Patent No. 436,315, dated September 9, 1890.

Application filed August 9, 1889. Serial No. 320,213. (No model.)

*To all whom it may concern:*

Be it known that I, HENRY S. PECK, a citizen of the United States, residing at North East, in the county of Erie and State of Pennsylvania, have invented certain new and useful Improvements in Rope-Clamps; and I do hereby declare the following to be a full, clear, and exact description of the invention, such as will enable others skilled in the art to which it appertains to make and use the same.

This invention relates to rope clamps or fastenings; and it consists in certain improvements in the construction thereof, as will be herein fully set forth, and pointed out in the claim.

Figure 1:
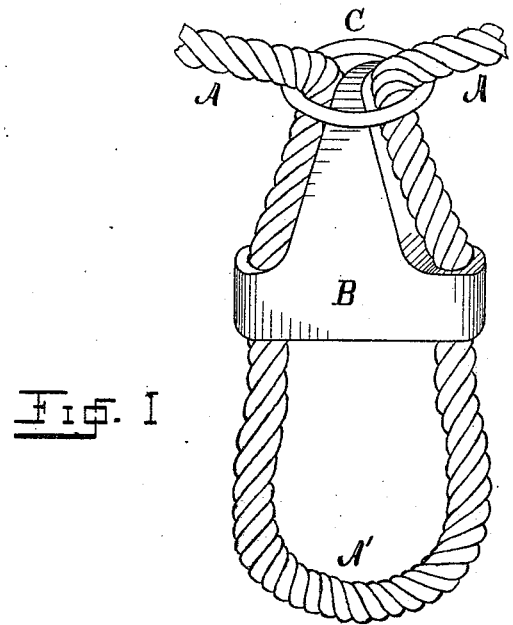
Figure 2:
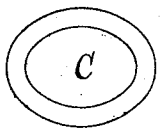
Figure 3:
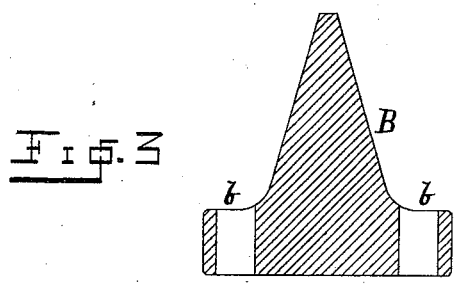

My device is illustrated in the accompanying drawings, as follows:

Figure 1 is a perspective view showing the device in position on a rope. Fig. 2 is a perspective view of the part C of the clamp. Fig. 3 shows the part B of the clamp in vertical section.

The clamp is designed for holding a rope in a looped position. The clamp is composed of two parts B and C. The part B is a wedge with rope openings or eyes $b\ b$ through its base vertically. The part C is a ring, which may be round or elliptical. Fig. 1 shows the position of the clamp on a rope. The ends of the rope A are threaded up through the eyes $b$ in the base of the wedge B and then through the ring C, forming a loop A' below the wedge, and thence through the ring C, and are then attached together or to any object desired. The clamping is effected by forcing the wedge into the ring between the two ropes, as seen in Fig. 1. The wedge B may be of cast metal or it may be of india-rubber, in which case the rubber should be vulcanized to a degree of considerable hardness.

What I claim as new is—

In a rope clamp or fastening, the combination of the ring C and wedge B, said wedge having eyes $b\ b$ through extensions from its base and the rope being threaded through said eyes and ring, substantially as shown.

In testimony whereof I affix my signature in presence of two witnesses.

HENRY S. PECK.

Witnesses:
 JNO. K. HALLOCK,
 WM. P. HAYES.